S. W. FARNSWORTH.
RECTIFIER SYSTEM.
APPLICATION FILED FEB. 5, 1914.
1,236,385.
Patented Aug. 7, 1917.
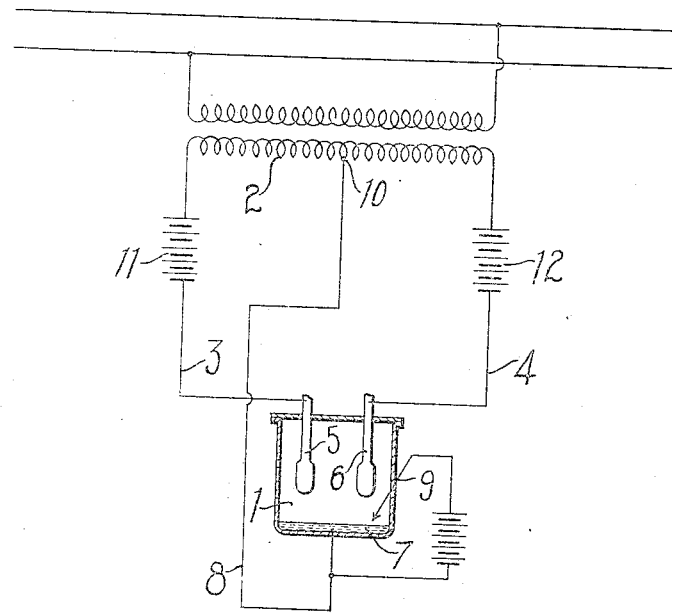

UNITED STATES PATENT OFFICE.

SIDNEY W. FARNSWORTH, OF PITTSBURGH, PENNSYLVANIA, ASSIGNOR TO WESTINGHOUSE ELECTRIC AND MANUFACTURING COMPANY, A CORPORATION OF PENNSYLVANIA.

RECTIFIER SYSTEM.

1,236,385.

Specification of Letters Patent.

Patented Aug. 7, 1917.

Application filed February 5, 1914. Serial No. 816,748.

*To all whom it may concern:*

Be it known that I, SIDNEY W. FARNSWORTH, a citizen of the United States, and a resident of Pittsburgh, in the county of Allegheny and State of Pennsylvania, have invented a new and useful Improvement in Rectifier Systems, of which the following is a specification.

My invention relates to systems for converting alternating current into direct current and utilizing the resulting direct current, and it has special reference to systems of this character in which vapor rectifiers are employed.

The object of my invention is to provide an efficient system of the character described, in which the danger of injury to the apparatus by reason of short circuiting within the rectifier shall be avoided.

In rectifier systems, as these have ordinarily been arranged, current is supplied from an alternating current source to a rectifier, and the uni-directional current proceeding from the rectifier is supplied to a load. If the source of alternating current is the secondary winding of a transformer, it is usual to supply current to the rectifier anodes from the end terminals of the transformer secondary, and to provide a connection from the direct current load to the middle point of the transformer. With such an arrangement, the anodes of the rectifier must have sufficient negative resistance to withstand the full voltage strain of the transformer, and if the negative resistance breaks down, a short circuit will occur between the anodes, which will be a direct short circuit on the transformer winding. The resulting current will be limited only by the reactance of the transformer, the resistance of the leads and the resistance of the vapor gap between the anodes. Such current is very large and may be as much as twenty times the normal current taken by the rectifier under normal full load.

I have improved this arrangement and greatly reduced the current which the anodes must carry in case of short circuiting by placing the load in the anode leads. If the load is such as is found in electrolytic industries, the voltage strain which the anodes are called upon to stand may be reduced to scarcely more than half the strain to which the anodes are subjected in the ordinary systems. Moreover, the current which can flow in case of short circuiting between the anodes, is very much less than the normal full load current, being limited by the resistance of the load.

The single figure of the accompanying drawing is a diagrammatic view showing one system of connections embodying my invention.

In the drawing, a rectifier 1 is supplied with current from an alternating current source which, as shown, is the secondary winding 2 of a transformer. Leads 3 and 4 connect the terminal points of the transformer to anodes 5 and 6 of the rectifier 1. The rectifier is provided with a vaporizable cathode 7, which may be of mercury, and a lead 8 connects the cathode to the middle point 10 of the transformer winding. One or more auxiliary keeping-alive electrodes 9 may also be provided. Loads 11 and 12 are connected in series in the leads 3 and 4 and these loads are represented as batteries of electrolytic cells, although my system may be used with any load which is adapted to receive pulsating uni-directional current. The batteries of cells used in the electrolytic industries are especially well adapted for my use because the current delivered to the loads, in my system, is intermittent and pulsating, being active only during alternate half-cycles of the alternating current supply. Such batteries require exceedingly large currents, which it is sometimes difficult to supply, even with large rotary converters, and such service is therefore especially severe for rectifiers, as usually connected. My invention, however, makes it entirely possible to use vapor rectifiers in this service, since both connections are equally well suited to the operation of the batteries.

It will be observed that the current from the transformer passes first through the loads 11 and 12, then to the anodes 5 and 6, then to the cathode 7 and thence back to the middle point 10 of the transformer winding.

In case the negative resistance of one of the anodes 5 and 6 is destroyed, a short circuit will form between them, and the current will return to the transformer directly through the anode lead. However, the current across the anodes, under such circumstances, is scarcely more than the normal current, because of the very high resistance of the loads 11 and 12, and no damage to the rectifier will result.

It is obvious that the embodiment of my invention which I have shown and described is merely illustrative and that my invention is applicable to a wide variety of systems. The alternating current employed may be either single-phase or polyphase, and the rectifiers employed may have either one or more auxiliary or keep-alive electrodes.

I claim as my invention:

1. A rectifier system comprising a plurality of rectifier anodes, a source of alternating current, a rectifier circuit comprising leads connecting each of the said anodes to points of different potential in said alternating current source, and a plurality of loads adapted to receive uni-directional current, one of the said loads being connected in series in each of the said leads.

2. A rectifier system comprising a source of alternating current, a transformer having a secondary winding provided with two end connections and an intermediate connection, a rectifier having a plurality of anodes and a vaporizable cathode, a lead connecting each terminal of the transformer winding to one of the said anodes, a load connected in series in each of the said leads, and a lead connecting the vaporizable cathode to the intermediate connection of the transformer.

3. The combination with a source of alternating current, of a vapor converter connected thereto, provided with a plurality of anodes and with a cathode, connections from each of said anodes to points in said source, a load device in each of said anode connections, and a connection from said cathode to an intermediate point in said source.

4. The combination with a source of single-phase alternating current, of a vapor converter provided with two working anodes and with a cathode, connections from each of said anodes to points in said source, load devices in each of said anode connections, and a connection from said cathode to an intermediate point in said source.

5. A rectifying system embodying a source of alternating current, a multi-anode rectifying device connected thereto, and a load, said load being subdivided and a portion thereof inserted in each anode connection.

In testimony whereof, I have hereunto subscribed my name this 30th day of Jan., 1914.

SIDNEY W. FARNSWORTH.

Witnesses:
  DAVID E. CALHOUN,
  B. B. HINES.